US012404827B2

(12) United States Patent
Atzkern et al.

(10) Patent No.: US 12,404,827 B2
(45) Date of Patent: Sep. 2, 2025

(54) FUEL INJECTOR OF AN INTERNAL COMBUSTION ENGINE AND COMBUSTION ENGINE

(71) Applicant: MAN Energy Solutions SE, Augsburg (DE)

(72) Inventors: Thomas Atzkern, Augsburg (DE); Dusan Mikeska, Munich (DE)

(73) Assignee: Everllence SE, Augsburg (DE)

( * ) Notice: Subject to any disclaimer, the term of this patent is extended or adjusted under 35 U.S.C. 154(b) by 0 days.

(21) Appl. No.: 18/650,503

(22) Filed: Apr. 30, 2024

(65) Prior Publication Data

US 2024/0369032 A1 Nov. 7, 2024

(30) Foreign Application Priority Data

May 4, 2023 (DE) ..................... 10 2023 111 573.1

(51) Int. Cl.
*F02M 47/02* (2006.01)
*F02M 61/14* (2006.01)

(52) U.S. Cl.
CPC .......... *F02M 47/022* (2013.01); *F02M 61/14* (2013.01)

(58) Field of Classification Search
CPC ........ F02M 61/00; F02M 61/02; F02M 61/16; F02M 61/08; F02M 61/042; F02M 61/10; F02M 61/168; F02M 61/18; F02M 63/0012
USPC ............................ 293/533.2, 533.3; 123/445
See application file for complete search history.

(56) References Cited

U.S. PATENT DOCUMENTS 2,530,128 A * 11/1950 Mashinter .............. F02M 59/14 417/520
2007/0210189 A1* 9/2007 Schurz ................... F02M 61/20 239/533.9

FOREIGN PATENT DOCUMENTS

| | | | | |
|---|---|---|---|---|
| DE | 10054182 | | 5/2002 | |
| DE | 10344880 | | 4/2005 | |
| DE | 102007018626 | | 10/2008 | |
| DE | 102007018626 | A1 * | 10/2008 | F02M 51/005 |
| DE | 102008044153 | A1 * | 6/2010 | F02M 51/0603 |
| DE | 102011117534 | A1 * | 5/2013 | F02M 55/04 |
| DE | 102020208273 | | 1/2022 | |
| DE | 102020210145 | A1 * | 2/2022 | |
| DE | 102022206220 | | 12/2023 | |
| EP | 1445473 | A1 * | 8/2004 | F02M 51/0603 |
| EP | 1519036 | | 3/2005 | |

OTHER PUBLICATIONS

DE 102007018626 A1—English Translation (Year: 2008).*
(Continued)

*Primary Examiner* — Lindsay M Low
*Assistant Examiner* — Teuta B Holbrook
(74) *Attorney, Agent, or Firm* — COZEN O'CONNOR

(57) ABSTRACT

A fuel injector for an internal combustion engine, which is configured for feeding fuel to a cylinder, having a housing, via which the fuel injector can be mounted to the internal combustion engine, a valve body engaging with a valve stem interacting with a valve seat, which can be moved relative to the valve seat for opening a fuel flow, having a bellows sealing element, which with a first end engages with the valve stem and with a second end with the housing, a sleeve body, which at least partly decouples the bellows sealing element from a fuel flow through the fuel injector and from fuel pressure pulsations.

10 Claims, 1 Drawing Sheet

(56) References Cited

OTHER PUBLICATIONS

Office Action of corresponding German Patent Application No. 10 2023 111 573.1.
European Search Report of corresponding European Patent Application No. 24161632.5, dated Sep. 6, 2024.

* cited by examiner

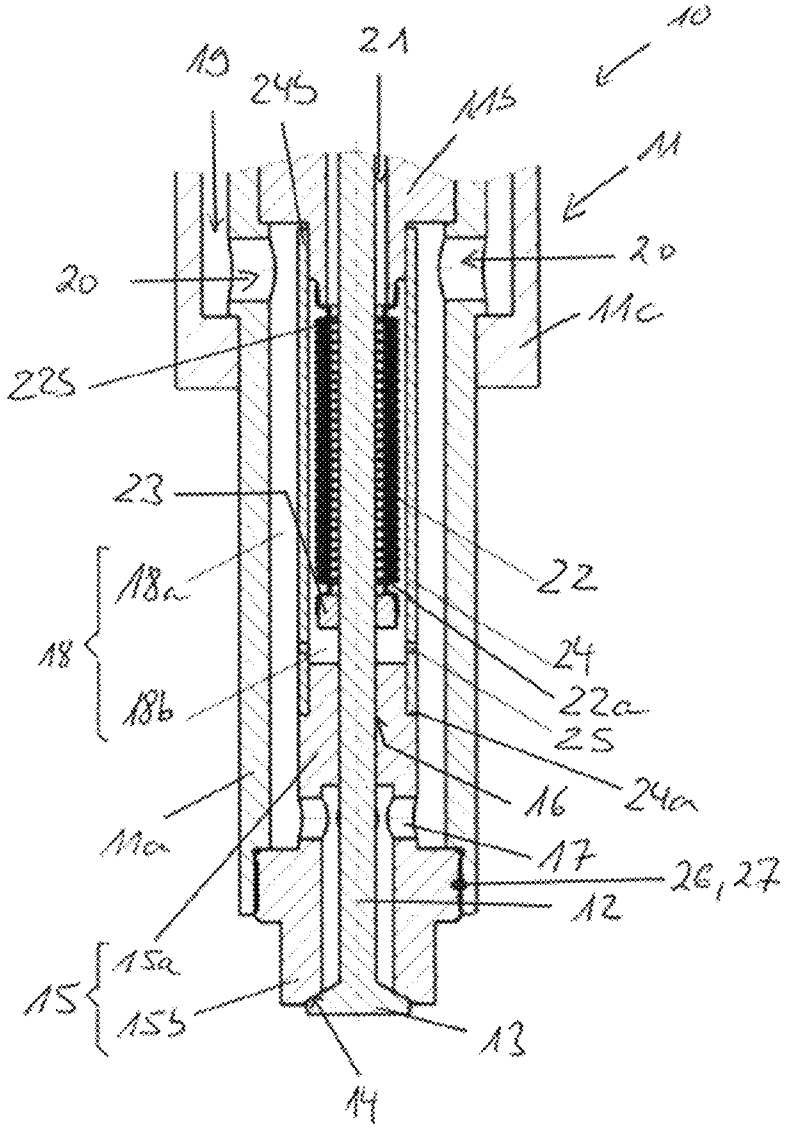
10
11
11b
11c
11a
12
13
14
15
15a
15b
16
17
18
18a
18b
19
20
21
22
22a
22b
23
24
24a
24b
25
26, 27

FUEL INJECTOR OF AN INTERNAL COMBUSTION ENGINE AND COMBUSTION ENGINE

BACKGROUND OF THE INVENTION

1. Field of the Invention

The disclosure relates to a fuel injector of an internal combustion engine and an internal combustion engine with such a fuel injector.

The disclosure relates in particular to so-called large engines or large internal combustion engines, the cylinders of which have piston diameters of at least 140 mm, in particular of at least 175 mm. Such large internal combustion engines are for example marine engines.

2. Description of Related Art

From practice, gas engines, liquid fuel engines or large internal combustion engines designed as dual-fuel engines are known. In liquid fuel internal combustion engines, a liquid fuel, such as for example a diesel fuel, is combusted. In internal combustion engines, a gaseous fuel, such as for example natural gas, is combusted. In dual-fuel engines, a liquid fuel can be combusted in a first operating mode and a gaseous fuel in a second operating mode.

In order to feed the fuel to cylinders of the internal combustion engine, internal combustion engines comprise fuel injectors. By way of a fuel injector, the fuel can be directly introduced into a combustion space or a combustion chamber of a cylinder or into a pre-chamber of the cylinder interacting with the combustion space or combustion chamber or into an intake pipe leading to the cylinder.

Fuel injectors have housing, via which the respective fuel injector can be mounted to an internal combustion engine. Further, fuel injectors have a valve body interacting with a valve stem, which valve body interacts with a valve seat. Dependent on the relative position between valve body and valve seat, a fuel flow is either opened or blocked.

In fuel injectors, a basic distinction is made between fuel injectors having a valve body opening towards the outside or a valve body opening towards the inside. With a fuel injector having a valve body opening towards the outside, the valve body, for opening a fuel flow, can be moved in a direction away from the housing or based on the housing, in the direction towards the outside. With a fuel injector having a valve body opening towards the inside, the valve body, by contrast, can be moved for opening the fuel flow, based on the housing, in the direction towards the inside into the housing. The invention can be employed with a fuel injector having a valve body opening towards the outside for opening the fuel flow, or even with a fuel injector having a valve body opening to the inside for opening the fuel flow.

SUMMARY OF THE INVENTION

There is a need for a fuel injector of an internal combustion engine having a longer lifespan.

Starting out from this, the present invention is based on the object of creating a new type of fuel injector of an internal combustion engine and an internal combustion engine having such a fuel injector.

The fuel injector comprises a housing via which the fuel injector can be mounted to the internal combustion engine. The fuel injector comprises a valve body interacting with a valve stem and interacting with a valve seat, which valve body, for opening a fuel flow, can be moved relative to the valve seat. The fuel injector comprises a bellows sealing element, which with a first end engages with the valve stem and with a second end with the housing. Further, the fuel injector comprises a sleeve body which at least partially decouples the bellows sealing element from a fuel flow through the fuel injector and from fuel pressure pulsations. By way of the sleeve body, the bellows sealing element can be protected from loads in particular through fuel pressure pulsations. The sleeve body decouples the bellows sealing element at least partially from the fuel flow. Pressure fluctuations or pressure pulsations within the fuel flow do not have a direct effect on the bellows sealing element. Thus, the fatigue strength of the bellows sealing element and thus the lifespan of the fuel injector can be increased.

Preferentially, the sleeve body divides a fuel space within the housing into first sub-space and a second sub-space, wherein the first sub-space can be flowed through by the fuel flow, and wherein the bellows sealing element is arranged in the second sub-space. Thus, fatigue strength of the bellow sealing element and thus the lifespan of the fuel injector can be particularly advantageously increased.

Preferentially, the first sub-space of the fuel space and the second sub-space of the fuel space are connected via at least one opening or bore or choke in the sleeve body. Thus it is possible to offset a volume change of fuel in the second sub-space caused by a stroke movement of the bellows sealing element, in which the bellows sealing element is arranged, in that fuel can flow via the at least one opening or bore or choke.

Preferentially, the first sub-space of the fuel space is formed between the housing and the sleeve body radially outside adjoining the sleeve body, wherein the second sub-space of the fuel space is formed radially inside adjoining the sleeve body, and wherein the sleeve body surrounds the bellows sealing element radially outside in such a manner that the bellows sealing element is arranged within the sleeve body. This design is particularly preferred in order to increase the fatigue strength of the bellows sealing element and thus the lifespan of the fuel injector.

Preferentially, the fuel injector comprises a guide and seat body with a guide portion and a seat portion, which is mounted to the housing or an integral part of the housing, wherein the guide portion of the guide and seat body guides the valve stem and the seat portion of the guide and seat portion provides the valve seat, and wherein the sleeve body, with a first end engages with the guide and seat body and with a second end with the housing. This embodiment is structurally simple.

Preferentially, the sleeve body is sealing connected in each case at its first end to the guide and seat body and at its second end to the housing. A coupling of the two sub-spaces of the fuel space takes place merely via the at least one opening or bore or choke. This is preferred in order to increase the fatigue strength of the bellows sealing element and thus the lifespan of the fuel injector.

Preferentially, the bellows sealing element is indirectly connected at its first end to the valve stem via a ring or shoulder interacting with the valve stem. This design is structurally particularly simple.

BRIEF DESCRIPTION OF THE DRAWINGS

Preferred further developments of the invention are obtained from the following description. Exemplary embodiments of the invention are explained in more detail by way of the drawing without being restricted to this. There it shows:

The FIGURE: is a schematic cross-section through a fuel injector of an internal combustion engine.

DETAILED DESCRIPTION OF THE PRESENTLY PREFERRED EMBODIMENTS

The FIGURE shows a cross-section through an exemplary embodiment of a fuel injector 10 for an internal combustion engine according to the invention. The fuel injector 10 can be both a fuel injector for liquid fuel and also a fuel injector for gaseous fuel. The fuel injector 10 is configured in order to feed fuel to a cylinder of the internal combustion engine, namely either directly into a combustion chamber of the cylinder or into a pre-chamber of the cylinder interacting with the combustion chamber or into a pipe of the internal combustion engine leading to the combustion chamber of the cylinder, which also carries combustion air to the cylinder.

The fuel injector 10 has a housing 11. Via the housing 11, the fuel injector 10 can be mounted to the internal combustion engine, for example in the region of a cylinder head or a cylinder head cover. Furthermore, the fuel injector 10 has a valve stem 12, which carries a valve body 13. The valve stem 12 can be directly actuated magnetically. The valve body 13 interacts with a valve seat 14. In particular when the valve body 13 lies against the valve seat 14, the fuel injector 10 does not allow any fuel flow. When by contrast the valve body 13 is lifted off the valve seat 14, the fuel injector 10 opens a fuel flow.

Furthermore, the fuel injector 10 has a guide and seat body 15 with a guide portion 15*a* for the valve stem 12 and a seat portion 15*b* providing the valve seat 14.

In the shown exemplary embodiment, this guide and seat body 15 is embodied relative to the housing 11 as separate, integral or monolithic assembly and mounted to the housing 11. According to the FIGURE, the guide and seat body 15 and the housing 11 are screwed to the guide and seat body 15, in particular to the seat portion 15*b* of the same via interacting threads, namely an internal thread 26 on the housing 11 and an external thread 27 on the guide and seat body 15.

As already explained, the guide portion 15*a* of the guide and seat body 15 guides the valve stem 12, wherein for this purpose the valve stem 12 penetrates a recess 16 in the guide portion 15*a*.

The seat portion 15*b* of the guide and seat body 15 provides the valve seat 14 for the valve body 13.

The guide portion 15*a* of the guide and seat body 15 can be flowed about by fuel. By contrast, the seat portion 15*b* of the guide and seat body 15 can be flowed through by the fuel. When the valve body 13 is lifted off the valve seat 14 and the fuel injector 10 opens a fuel flow, the fuel flows about the guide portion 15*a* and flows through the seat portion 15*b* of the guide and seat body 15.

By way of expansions or bores 17, the fuel, with opened fuel injector 10, emanating from the guide portion 15*a*, can overflow into the seat portion 15*b*.

It is pointed out here that the guide and seat body 15 can also be an integral part of the housing 11. The guide and seat body 15 can also be divided into multiple bodies, namely into a guide body, which guides the valve stem 12, and into a seat body that is separate relative to the guide body, which provides the valve seat.

Multiple parts or portions 11*a*, 11*b* and *c* of the housing 11 are shown. In the shown exemplary embodiment, the guide and seat body 15 engages with a first end of the housing part or housing portion 11*a*. Accordingly, the internal thread 26 which interacts with the external thread 27 of the guide and seat body 15 is formed on this end of the housing part or housing portion 11, in order to fasten the guide and seat body 15 to the housing part or housing portion 11*a* by screw connection. The housing portion 11*a* delimits radially outside a fuel space 18 of the fuel injector, wherein the fuel, emanating from an annular gap 19 formed between the housing part or housing portion 11*a* and the housing part or housing portion 11*c* can overflow via openings or bores 20. The housing part or the housing portion 11*b* is received in the housing part or housing portion 11*a*. The valve stem 12, which is guided in the guide portion 15*a* of the guide and seat body 15, penetrates the fuel space 18, which is delimited by the housing part or housing portion 11*a* radially outside. Further, the valve stem 12 penetrates the housing part or housing portion 11*b*.

In order to prevent that fuel, emanating from the fuel space 18, flows via a gap 21 formed between the valve stem 12 and the housing part or the housing portion 11*b*, a bellows sealing element 22 is arranged within the fuel space 18. The bellows sealing element 22 engages with a first end 22*a* with the valve stem 12 and with an opposite end 22*b* with the housing 11, namely with the housing part or housing portion 11*b*. The connection of the first end 22*a* of the bellows sealing element 22 to the valve stem 12 and the connection of the second end 22*b* of the bellows sealing element 22 to the housing 11, namely to the housing part or housing portion 11*b*, is fluid-tight in each case. Because of the bellows structure of the bellows sealing element 22, the bellows sealing element 22 can offset or compensate for the relative movement between valve stem 12 and housing 11 upon a stroke movement of the valve stem 12.

The bellows sealing element 22, in the shown exemplary embodiment, engages with its first end 22*a* directly with the valve stem 12, namely with a ring or shoulder 23, which is connected to the valve stem 12 firmly and in a fluid-tight manner. The opposite second end 22 of the bellows sealing element 22 engages directly with the housing 11, namely with the housing part or housing portion 11*b*, in a fluid-tight manner. The ring or shoulder 23 can also be an integral part of the valve stem 12.

It is not only the bellows sealing element 22 that is arranged in the fuel space 18 but in addition a sleeve body 24. In the shown exemplary embodiment, the sleeve body 24 with a first end 24*a* engages with the guide and support body 15, namely with the guide portion 15*a* of the same, and with a second, opposite end 24*b*, with the housing 11, namely with the housing part or housing portion 11*b*.

The sleeve body 24 decouples the bellows sealing element 22 from the fuel flow through the fuel injector 10 and from pressure pulsations of the fuel at least partially. Thus, it can be ensured that pressure fluctuations in the fuel space 18 do not have a direct effect on the bellows sealing element 22. Accordingly, the bellows sealing element 22 can be protected in particular from pressure peaks, as a result of which the fatigue strength of the bellows sealing element and thus the lifespan of the fuel injector 10 are increased.

The sleeve body 24 arranged in the fuel space 18 divides the fuel space 18 into a first sub-space 18*a* and a second sub-space 18*b*. The first sub-space 18*a* can be flowed through by the fuel flow, while the bellows sealing element 22 is arranged in the second sub-space 18*b*. The first sub-space 18*a* is formed between the housing, namely the housing part or housing portion 11*a*, and the sleeve body 24, the second sub-space 18*b* is arranged radially within the sleeve body 24. The first sub-space 18*a* of the fuel space 18 accordingly adjoins the sleeve body 24 radially outside, the second sub-space 18*b* the sleeve body 24 radially inside.

In the shown exemplary embodiment, the sleeve body 24 with its first end 24*a* is connected to the guide and seat body 15 in a sealing manner, on the opposite second end 24*b*, to the housing in a sealing manner, namely the housing part or housing portion 11*b*. The sleeve 24 is a rigid sleeve which does not have to offset a relative movement between the housing part or housing portion 11*b* and the guide and seat body 15, since such a relative movement does not occur.

The first sub-space 18*a* of the fuel space 18 is connected to the second sub-space 18*b* of the fuel space 18, preferentially via at least one opening or bore or choke 25 in the sleeve body 24. Thus, a change in volume of fuel in the sub-space 18*b* caused by a stroke movement of the valve stem 12 and thus of the bellows sealing element 22 can be offset.

The bellows sealing element 22 is preferentially an element of a metallic material. The sleeve body 24 can be produced from a metallic material or from a plastic.

The sleeve body 24 avoids or reduces the effect of the fuel pressure on the bellows sealing element 22. Thus, the fatigue strength of the bellow sealing element 22 is increased. The lifespan of the fuel injector 10 can be increased. Further it is possible to expand operating parameters, in particular utilise higher fuel pressures. Higher fuel pressures can be absorbed by the sleeve body 24. A direct fuel inflow onto the bellows sealing element 22 is prevented by the sleeve body 24. The same is thus shielded against the fuel flow as a result of which the fatigue strength of the same is increased. During the mounting, the bellow sealing element 22 can be protected by the sleeve body 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel injector for an internal combustion engine, and configured to feed fuel to a cylinder of the internal combustion engine, comprising:
- a housing, via which the fuel injector can be mounted to the internal combustion engine;
- a valve stem;
- a guide and seat body comprising a valve seat;
- a valve body that engages with the valve stem and which interacts with the valve seat, and which for opening a fuel flow is moveable relative to the valve seat;
- a bellows seal, which with a first end that engages with the valve stem and a second end that engages with the housing; and
- a sleeve body which with a first end that engages with the guide and seat body and a second end that engages with the housing and which at least partially decouples the bellows seal from a fuel flow through the fuel injector and from fuel pressure pulsations, wherein
- the sleeve body divides a fuel space within the housing into a first sub-space and a second sub-space,
- the fuel flow to the valve seat is entirely through the first sub-space, and
- the bellows seal is arranged in the second sub-space.

2. The fuel injector according to claim 1, wherein
the first sub-space of the fuel space and the second sub-space of the fuel space are connected via at least one opening or bore or choke in the sleeve body.

3. The fuel injector according to claim 1, wherein
the first sub-space is formed between the housing and the sleeve body adjoining the sleeve body radially outside, and
the second sub-space is formed adjoining the sleeve body radially inside.

4. The fuel injector according to claim 1, wherein
the sleeve body surrounds the bellows seal radially outside in such a manner that the bellows seal is arranged within the sleeve body.

5. The fuel injector according to claim 1,
wherein the guide and seat body comprises a guide portion and a seat portion, which is mounted to the housing or is an integral part of the housing,
wherein a guide portion of the guide and seat body guides the valve stem and a seat portion of the guide and seat body provides the valve seat.

6. The fuel injector according to claim 5, wherein
the sleeve body at its first end is sealingly connected to the guide and seat body and sealingly connected at its second end to the housing.

7. The fuel injector according to claim 1, wherein
the bellows seal is sealingly connected at its first end to the valve stem and sealingly connected at its second end to the housing.

8. The fuel injector according to claim 1, wherein
the bellows seal is indirectly connected at its first end to the valve stem via a ring or a shoulder interacting with the valve stem.

9. The fuel injector according to claim 1,
wherein the bellows seal is a metallic material, and
wherein the sleeve body is a metallic material or a plastic.

10. An internal combustion engine, comprising:
cylinders; and
a fuel injector for each cylinder comprising:
- a housing, via which the fuel injector can be mounted to the internal combustion engine;
- a valve stem;
- a guide and seat body comprising a valve seat;
- a valve body that engages with the valve stem and which interacts with the valve seat, and which for opening a fuel flow is moveable relative to the valve seat;
- a bellows seal, which with a first end that engages with the valve stem and a second end that engages with the housing; and
- a sleeve body which with a first end that engages with the guide and seat body and a second end that engages with the housing and which at least partially decouples the bellows seal from a fuel flow through the fuel injector and from fuel pressure pulsations, wherein the sleeve body divides a fuel space within the housing into a first sub-space and a second sub-space, the fuel flow to the valve seat to is entirely through the first sub-space, and the bellows seal is arranged in the second sub-space.

* * * * *